F. V. BREEDEN.
SCREW CUTTING LATHE.
APPLICATION FILED AUG. 29, 1916.
1,216,060.
Patented Feb. 13, 1917.
2 SHEETS—SHEET 1.
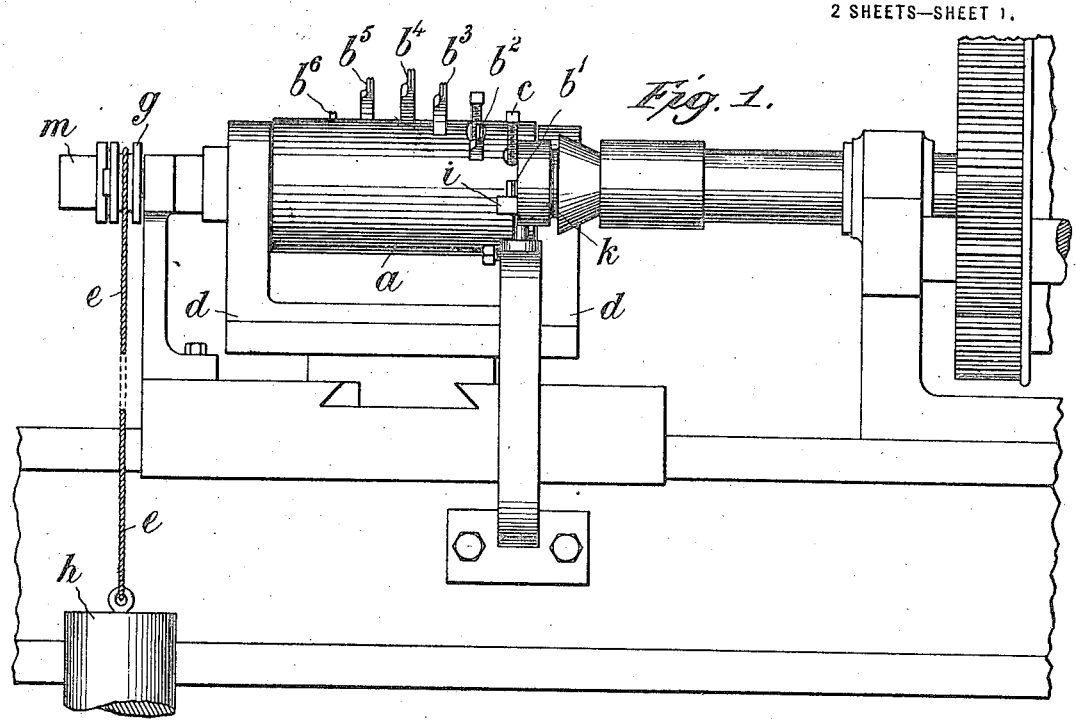
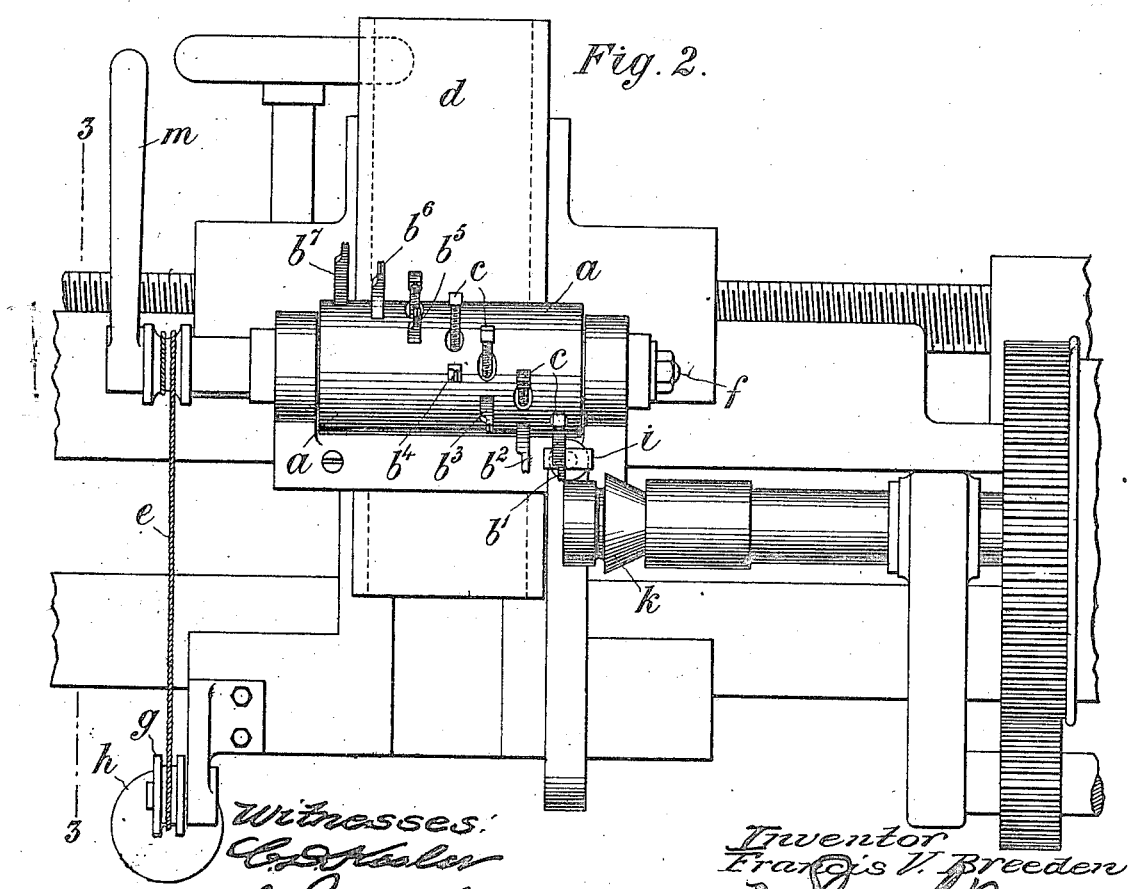
Witnesses:
Inventor
Francis V. Breeden F. V. BREEDEN.
SCREW CUTTING LATHE.
APPLICATION FILED AUG. 29, 1916.
1,216,060.
Patented Feb. 13, 1917.
2 SHEETS—SHEET 2.
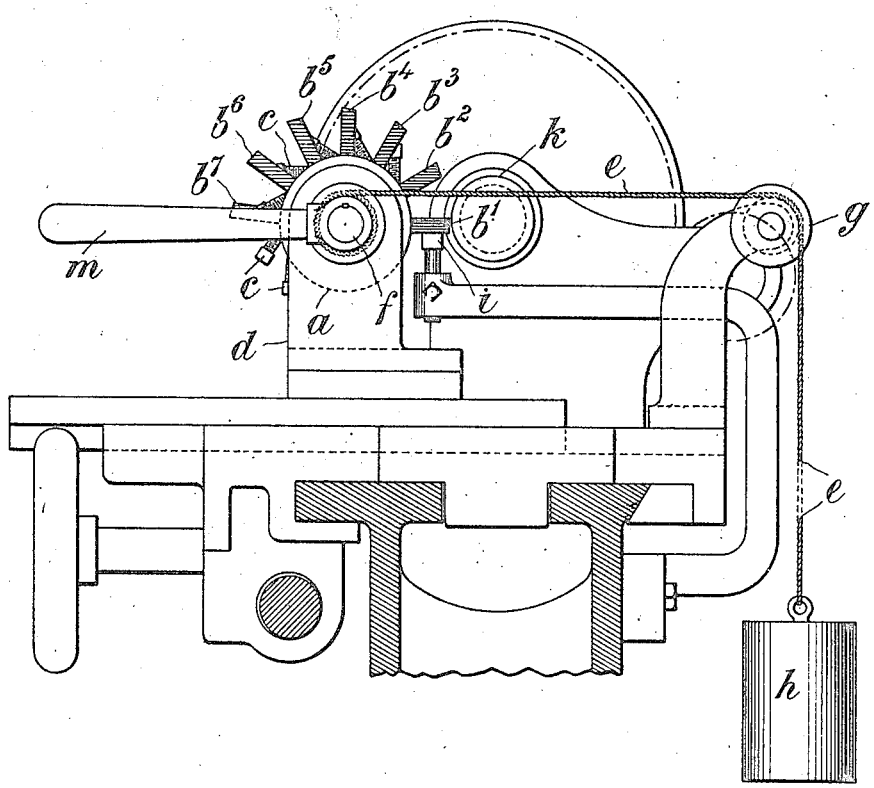
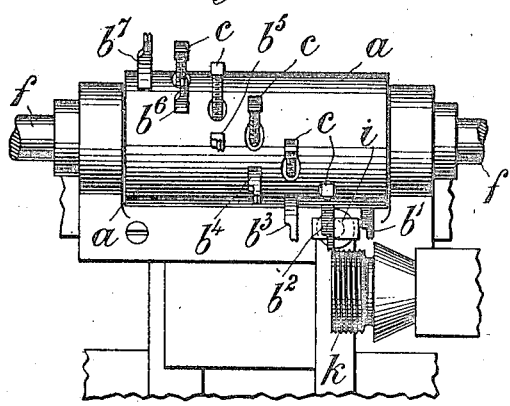
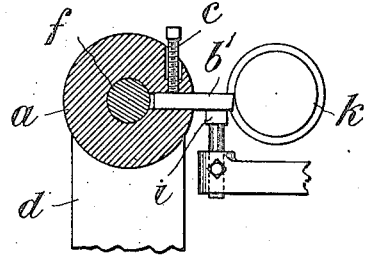
Witnesses:
Inventor
Francis V. Breeden

UNITED STATES PATENT OFFICE.

FRANCIS VERNON BREEDEN, OF BIRMINGHAM, ENGLAND.

SCREW-CUTTING LATHE.

1,216,060.  Specification of Letters Patent.  Patented Feb. 13, 1917.

Application filed August 29, 1916. Serial No. 117,476.

*To all whom it may concern:*

Be it known that I, FRANCIS VERNON BREEDEN, a subject of the King of Great Britain, residing at Birmingham, England, have invented certain new and useful Improvements in Screw-Cutting Lathes, of which the following is a specification.

My invention consists of the improvements hereinafter described in or relating to screw-cutting lathes, and has particular reference to the screw-cutting tools of the said lathes; the said invention having for its object to provide new or improved cutting mechanism by the use of which the reversing of the traverse of the slide rest and the adjustment of the cutting tool from time to time during the cutting operation for effecting the deepening of the cut are obviated, and a very accurate, complete and expeditious cutting of the thread is effected by a single traverse of the slide rest carrying the improved cutting mechanism.

In carrying the said invention into effect, I employ a series of cutting tools mounted on a rotatable and preferably cylindrical tool holder or carrier, so as to project radially therefrom, the said tool holder or carrier constituting part of a traversing slide rest and being capable of receiving an intermittent partial rotation for the purpose of bringing each of the cutters carried thereby successively into operation.

The said cutters are spaced apart both longitudinally and angularly on the holder or carrier, the longitudinal distance between the adjacent or presented sides of each cutter being slightly greater than the length of the thread to be cut on the article under operation, and the angular distance between each succeeding cutter being of any desired or convenient dimension within the limits determined by the number of cutters to be employed and by the diameter of the cutter holder or carrier on which they are mounted. The acting or cutting points of each succeeding cutter are at a slightly greater distance from the axis of the holder or carrier than the one which precedes it, so that each cutter, when operating, effects a deeper cut than the one immediately preceding it.

Arranged behind the cutter holder or carrier is a stop or support, preferably adjustably mounted on the bed of the lathe, on which stop or support the first and each succeeding cutter rests during the cutting operation, and the intermittent partial rotation of the cutter holder takes place as each cutter passes by the traversing motion of the slide rest; and after effecting its cutting operation from off the stop or support, the next succeeding cutter being thereby brought on to the stop or support and into operation.

The intermittent partial rotation of the cutter holder or carrier is automatic, and may be effected by a band, rope or cable passing around a groove or grooves in the holder and having one end fixed thereto, its other or free end carrying a weight, but I do not limit myself to any particular means for effecting the automatic rotation of the cutter.

I will further describe my invention in connection with the accompanying drawings.

Figure 1 represents in rear elevation a portion of a screw cutting lathe to which my improvements are applied.

Fig. 2 is a plan of the same, and Fig. 3 is a cross section taken on the dotted line 3—3 Fig. 2.

Figs. 4 and 5 are detail views hereinafter particularly described.

The same letters of reference indicate the same parts in the several figures of the drawings.

$a$ is the rotatable tool holder, the cutting tools $b^1$, $b^2$, $b^3$, $b^4$, $b^5$, $b^6$, $b^7$ carried by the said holder $a$ being mounted in radial slots in the said holder and fixed by the screw pins $c$ (or otherwise) as is best seen in Fig. 5 which shows a portion of the arrangement in cross section. The number of cutting tools may be varied to suit any requirement. The series of cutting tools $b^1$ to $b^7$ are spaced apart in the tool holder $a$ both longitudinally and angularly as will be well understood by reference to the several figures of the drawings.

The spindle of the rotatable tool holder $a$ is mounted on and carried by the slide rest $d$ of the lathe, and the said spindle is capable of being rotated in one direction for resetting the tool holder by the handle $m$ fixed to the said spindle, the spindle and tool holder $a$ being rotated in the other direction automatically for the purpose of bringing the several cutting tools successively into operation by a rope or cable $e$ which is fixed to the spindle $f$ of the tool holder $a$. The said rope or cable is coiled several times around a neck or annular groove in the spindle $f$ and carried over a pulley $g$ (see Figs. 2 and 3), a weight $h$ being attached to or suspended from the other or free end of the rope or cable.

An adjustable tool rest or support $i$ supports the cutting tool which, for the time being, is in action, and the tool support $i$ is of such a length that it terminates at the point where the screw cutting action on the cylindrical body or article $k$ under operation is to finish. The tool $b^1$ is carried along the support $i$ by the motion of the slide rest $d$ which is effected in the usual way, and when the first tool $b^1$ (seen in action in the plan view, Fig. 3) has passed off the support $i$, as is seen in the plan view, Fig. 4, the tool holder $a$, is partially rotated under the action of the weight $h$, and the second tool $b^2$ is thereby brought into position for starting a second and deeper cutting action on the body or article $k$ under operation, as is represented in the said plan view, Fig. 4. This action is repeated until the whole of the cutting tools have, by the single traverse of the slide rest, been brought successively into operation the screw cut being gradually deepened by each succeeding operation.

The upper surface of the rest or support $i$, on which the tools bear when in action, may be made slightly yielding by the provision of a buffer or spring thereon.

To insure the several cutting tools coming properly into action, I prefer to form the said cutting tools from pieces of bar metal which are placed in the respective holes in the tool holder which they are to occupy when in use, all projecting to the same extent, and the partial screw threads are formed on the said pieces of bar metal by bringing them successively against a "hob" or master die. The screw cutting tools having been thus adjusted it is only necessary subsequently to adjust the tools radially for the purpose of determining the depth of cut to be effected by each tool.

I wish it to be understood that I do not limit myself to the precise construction and arrangement of parts herein before described and illustrated, as the same way may be varied within the scope of the appended claims without departing from my invention; for example, each cutter may be mounted on a separate short cylinder or disk-like carrier the series of cutter carriers, being mounted on the spindle $f$ so as to rotate therewith when the same is turned automatically for bringing the several cutters successively into operation, or is turned backward by the handle $m$ for re-setting the tool carrier when the slide rest $d$ has been brought into its initial position.

Having described my invention what I claim as new and desire to secure by Letters Patent is:—

1. In a screw-cutting lathe, a rotatable tool holder; a series of tools carried thereby and spaced apart both longitudinally and angularly, the distance between successive tools being approximately equal to the length of the thread to be cut; and operating means for said holder.

2. In a screw-cutting lathe, a rotatable tool holder; a traveling slide rest whereon the holder is mounted; a series of tools carried by said holder and spaced apart both longitudinally and angularly; a support for the tool in action; and automatic means for partially rotating said holder when the active tool is carried beyond said support by the travel of said slide rest, so as to bring the next tool into position for operation.

3. In a screw-cutting lathe, a rotatable tool holder; a series of tools carried thereby and spaced apart both longitudinally and angularly, the distance between successive tools being approximately equal to the length of the thread to be cut; and the cutting point of each tool being at a slightly greater distance from the axis of the holder than that of the immediately-preceding tool; and operating means for said holder.

4. In a screw-cutting lathe, a rotatable tool holder; a traveling slide rest whereon the holder is mounted; a series of tools carried by said holder and spaced apart both longitudinally and angularly, the distance between successive tools being approximately equal to the length of the thread to be cut; a support for the tool in action; and automatic means for partially rotating said holder when the active tool is carried beyond said support by the travel of said slide rest, so as to bring the next tool into position for operation.

5. In a screw-cutting lathe, a rotatable tool holder; a traveling slide rest whereon the holder is mounted; a series of tools carried by said holder and spaced apart both longitudinally and angularly, the distance between successive tools being approximately equal to the length of the thread to be cut, and the cutting point of each tool being at a slightly greater distance from the axis of the holder than that of the immediately-preceding tool; a support for the tool in action; and automatic means for partially rotating said holder when the active tool is carried beyond said support by the travel of said slide rest, so as to bring the next tool into position for operation.

In testimony whereof I have hereunto set my hand in presence of two subscribing witnesses.

FRANCIS VERNON BREEDEN.

Witnesses:
ARTHUR J. POWELL,
WILLIAM J. BOWKER.